United States Patent
Key et al.

(10) Patent No.: US 11,940,069 B2
(45) Date of Patent: *Mar. 26, 2024

(54) CONDUCTIVE INSERT FOR GASKET

(71) Applicant: United States Pipe and Foundry Company, LLC, Birmingham, AL (US)

(72) Inventors: Jerry Gregory Key, Trussville, AL (US); Kenneth J Watts, Alpine, AL (US); Jay Derek Caston, Trussville, AL (US)

(73) Assignee: United States Pipe and Foundry Company, LLC, Birmingham, AL (US)

( * ) Notice: Subject to any disclaimer, the term of this patent is extended or adjusted under 35 U.S.C. 154(b) by 456 days.

This patent is subject to a terminal disclaimer.

(21) Appl. No.: 17/201,404

(22) Filed: Mar. 15, 2021

(65) Prior Publication Data
US 2022/0154860 A1  May 19, 2022

Related U.S. Application Data

(63) Continuation of application No. 17/097,326, filed on Nov. 13, 2020, now Pat. No. 11,054,070.

(51) Int. Cl.
*F16L 25/01* (2006.01)
*F16L 21/03* (2006.01)

(52) U.S. Cl.
CPC ............. *F16L 25/01* (2013.01); *F16L 21/03* (2013.01)

(58) Field of Classification Search
CPC ......... F16L 17/06; F16L 17/032; F16L 17/02; F16L 21/03; F16L 25/01
See application file for complete search history.

(56) References Cited

U.S. PATENT DOCUMENTS

| | | | | |
|---|---|---|---|---|
| 2,589,876 | A | * | 3/1952 | Sesher ............... F16L 25/01 285/329 |
| 2,966,539 | A | * | 12/1960 | Sears ............... F16L 25/01 174/370 |
| 2,991,092 | A | * | 7/1961 | MacKay ............ F16L 17/035 277/625 |
| 3,284,561 | A | * | 11/1966 | Clements ........... F16L 25/01 439/108 |
| 4,229,026 | A | * | 10/1980 | Seiler ............... F16L 37/52 277/625 |
| 10,088,082 | B2 | * | 10/2018 | Copeland .......... F16L 21/03 |
| 11,054,070 | B1 | * | 7/2021 | Key .................. F16L 25/01 |
| 2002/0106923 | A1 | * | 8/2002 | Copeland ........... H01R 4/60 439/192 |

FOREIGN PATENT DOCUMENTS

WO   WO-9508072 A1 *  3/1995  ............. F16J 15/121

* cited by examiner

*Primary Examiner* — Eugene G Byrd
(74) *Attorney, Agent, or Firm* — Jacob W Neu; BRADLEY ARANT BOULT CUMMINGS, LLP

(57) ABSTRACT

A part of a gasket that conducts electricity across the otherwise nonconducting gasket. Versions of the insert provide an electrical connection when installed even if the parts sealed by the gasket deflect, and do not deform under compression due to their resilient nature. The gaskets can be used in pipe joints, among other uses, resulting in a pipe joint that conducts electricity between the pipe spigot and the socket of a pipe or fixture even if a deflection event occurs.

22 Claims, 3 Drawing Sheets

CONDUCTIVE INSERT FOR GASKET

CROSS REFERENCE TO RELATED APPLICATIONS

The present application is a continuation of U.S. patent application Ser. No. 17/097,326, filed Nov. 13, 2020 (currently pending).

BACKGROUND

Field

The present disclosure relates generally to the sealing of joints with gaskets, and specifically the sealing of pipe joints with gaskets.

Background

Pipe networks are typically composed of multiple lengths of metal pipe jointed together. Although pipe joints are necessary to allow the assembly of multiple lengths of pipe, they pose a problem when an electrical current needs to be passed through the pipe network. Electrical currents are passed through metal pipe networks for several reasons. For example, to heat the pipe when the ambient temperature around the pipe would otherwise freeze the fluid being transported. As another example, to prevent anodic corrosion caused by localized variation in ionic potential around the pipe. As a third example, to provide low levels of power to devices associated with the pipe.

Although metal pipes themselves conduct electricity well, there is limited contact between two lengths of pipe at a pipe joint. Generally, a spigot end of one pipe is inserted into a socket end of the bell of a second pipe, but there is not contact between the two pipes over 100% of their surfaces where they overlap. Often a gasket made of nonconductive polymer is positioned between the spigot end and the socket end. Although the gasket is very useful to ensure a good seal inside the joint, by placing a nonconductive body between the two pipes electrically conductive contact between them is reduced or eliminated.

One solution to this problem has been the use of polymer gaskets containing one or more bodies made of conducting metal. Although this provides an electrical connection between the two pipes, such conductive gaskets have caused a host of problems. One such problem is that the metal bodies tend to be soft, and unlike the polymer portion of the gasket they are not resilient when compressed. Instead of exerting counter-pressure against the pipes, the soft metal bodies tend to permanently deform. Once deformed they no longer press tightly against the pipes, and the contact area is reduced. The same thing can result if deflection occurs between the two pipes, due to seismic activity or other disturbances. If the alignment of the two pipes is disturbed it can result in some (or all) of the metal portions of the gasket separating from the socket or the spigot. Although some of the metal bodies may remain in contact with both pipes, the total conductive surface area is reduced.

Reduced conductive surface area can result in a drop in the amount of current in the circuit, and can also result in excessive heating of those metal bodies in the gasket that still form a circuit. Such excessive heating can lead to softening and deformation of the metal bodies; and in some cases can melt or burn the polymer portions of the gasket.

There remains a need in the art for a way to maintain an electrical connection across a pipe joint that will maintain its integrity over time, resisting separation due to deflection of the pipes, and resisting deformation of the conductive elements due to creep.

SUMMARY

The present disclosure describes a conductive insert for a gasket that addresses the problems described above by providing high-capacity conductive contact between a socket and a pipe spigot end. Embodiments of the insert can provide both high conductivity and high resilience by positioning a resilient body inside the insert's conductive elements, which prevents creep deformation of the conductive surface over time. Embodiments of the insert can provide a strong electrically conductive connection even when the joint deflects by positioning a conductive surface to make up the majority of a groove that accommodates a retainer bead on the socket. Further advantages are realized as explained below.

In a first aspect, an insert to provide conductivity to a gasket is provided, the insert having a radial outer surface defined in part by a groove, and a radial inner surface, and comprising: a conductive body roughly in the shape of a U formed by a first stem, a second stem, and an aperture between the first and second stems, wherein the first stem forms a majority of the groove's surface, the second stem forms a majority of the radial inner surface; a retainer body along the radial outer surface and adjoining the first stem; and a compressible resilient body in the aperture of the U.

In a second embodiment, an insert to provide conductivity across a gasket between a first pipe and a second pipe is provided, the insert comprising: a U-shaped conductive body having a first stem with a first exterior surface, a second stem with a second exterior surface, and a space between the first stem and second stem; a non-compressible body adjoining a portion of the second exterior surface; and a compressible body filling the space between the first stem and the second stem, wherein the first exterior surface and the compressible body define, at least partially, the radial inner surface of the insert, and the second exterior surface and the non-compressible body at least partially form a radial outer surface of the insert, and further wherein the radial outer surface comprises a groove defined in major part by the second exterior surface.

In a third aspect, a gasket for providing an electrically conductive connection between two pipes is provided, the gasket having an inner radial surface and an outer radial surface, and comprising: a resilient sealing bulb; a rigid gasket heel connected to the sealing bulb, the gasket heel comprising a groove on the outer radial surface and a retainer on the outer radial surface opposite the sealing bulb; and the insert of the first or second aspect.

In a fourth aspect, a gasket for providing an electrically conductive connection between two pipes is provided, the gasket having an inner radial surface and an outer radial surface, and comprising: a resilient sealing bulb; a rigid gasket heel connected to the sealing bulb, the gasket heel comprising a groove on the outer radial surface and a retainer on the outer radial surface opposite the sealing bulb; and a plurality of conductive bodies, each forming a majority of the surface of the groove, and each forming a majority of the surface of the heel.

In a fifth aspect, a conductive pipe joint is provided, the joint comprising: a first pipe having a socket end; a second pipe have a spigot end; and the gasket of the third or fourth aspect between the outer surface of the spigot end and the inner surface of the socket end.

In a sixth aspect, a method of assembling a pipe joint is provided, the method comprising: inserting a gasket of the third or fourth aspects into a gasket seat of a socket so that the insert contacts a retainer bead of the gasket seat; and inserting a spigot end of a pipe into the socket so as to compress the gasket between the spigot end and the gasket seat.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

A. Definitions

Figure 1:
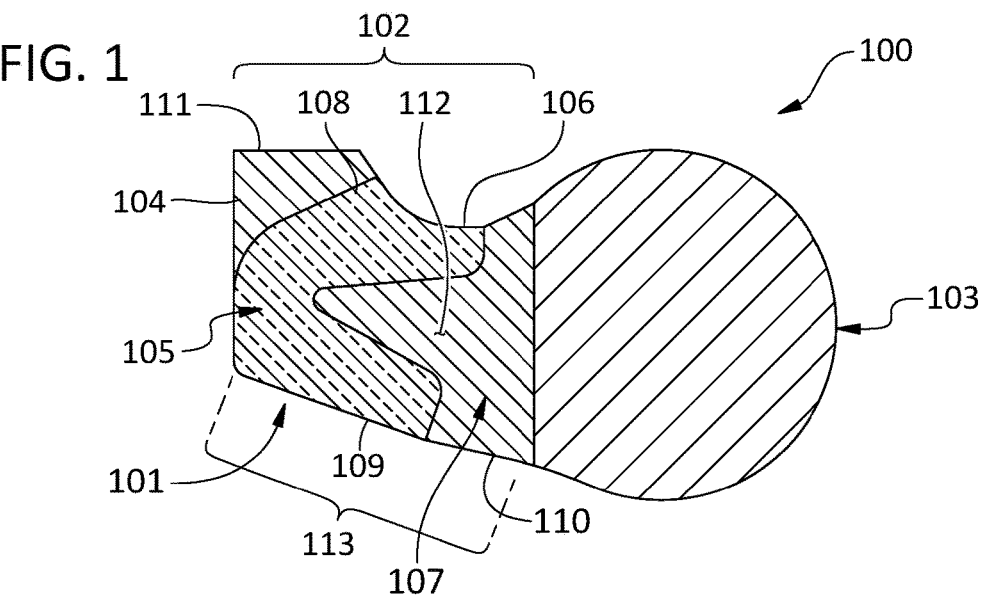
FIG. 1. A cross-sectional perspective view of an embodiment of the new gasket, including detail of an embodiment of the conductive insert.
Figure 2:
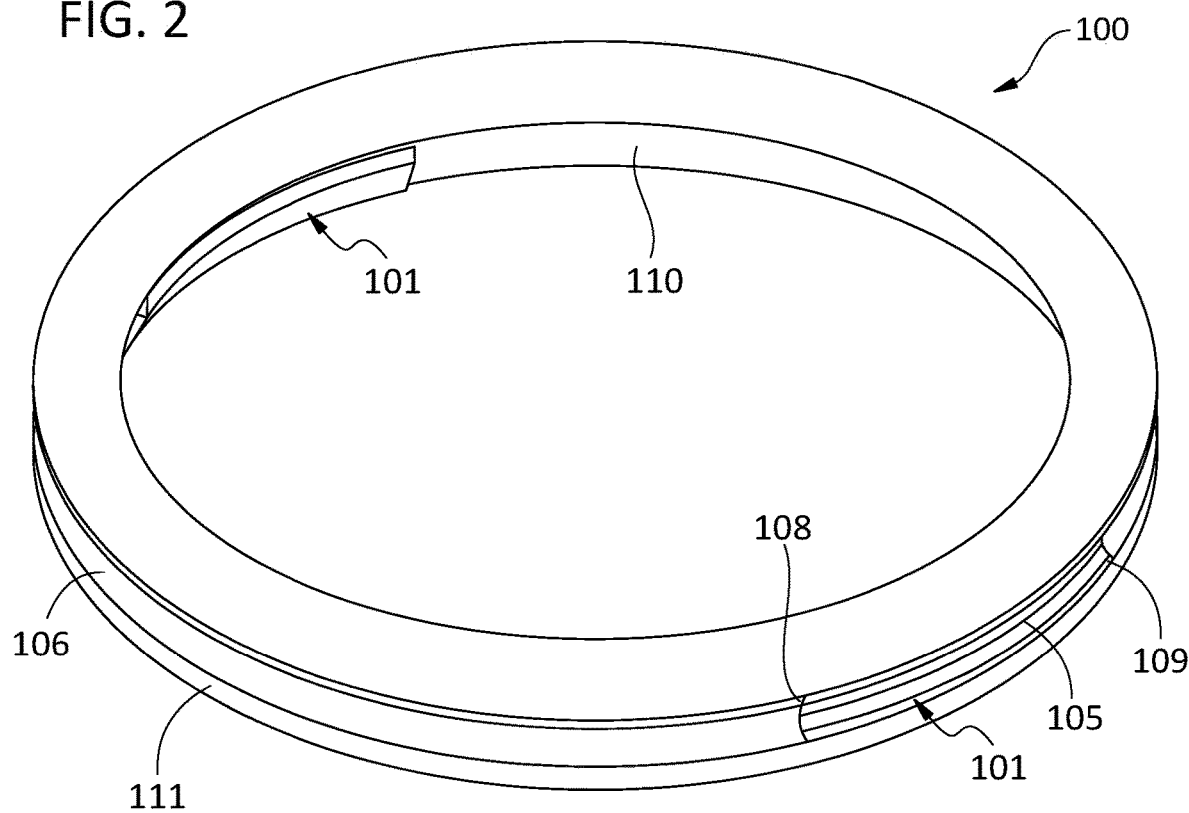
FIG. 2. A perspective view of a gasket containing an embodiment of the insert.
Figure 3:
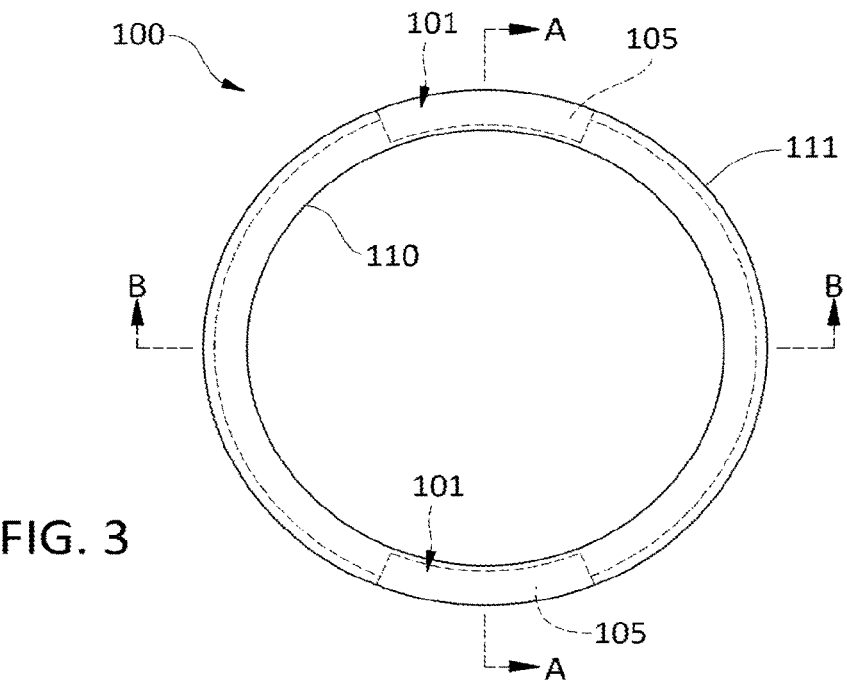
FIG. 3. A top view of the gasket shown in FIG. 2.
Figure 4:
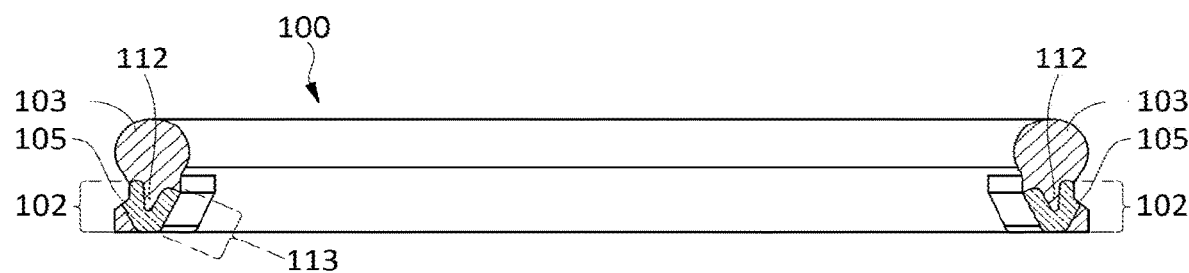
FIG. 4. A cross-sectional view of the gasket shown in FIGS. 2 and 3 (A-A).
Figure 5:
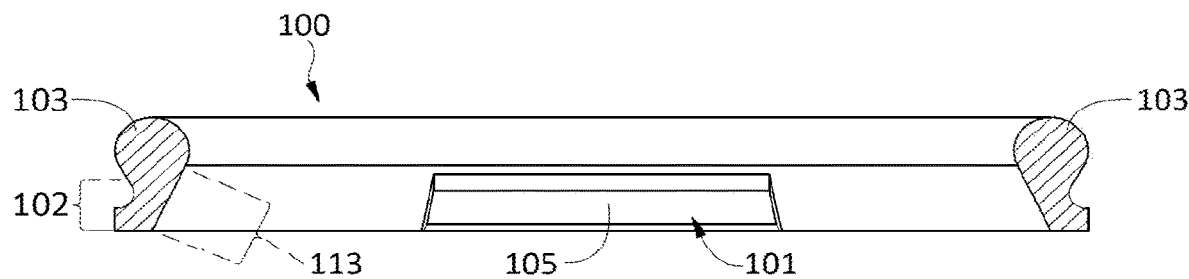
FIG. 5. Another cross-sectional view of the gasket shown in FIGS. 2 and 3 (B-B).

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, more preferably within 5%, and still more preferably within 1% of a given value or range of values. Numerical quantities given in this description are approximate unless stated otherwise, meaning that the term "about" or "approximately" can be inferred when not expressly stated.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well, unless the context clearly indicates otherwise.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer list (e.g., "at least one of A, B, and C").

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

In some places reference is made to standard methods, such as but not limited to methods of measurement. It is to be understood that such standards are revised from time to time, and unless explicitly stated otherwise reference to such standard in this disclosure must be interpreted to refer to the most recent published standard as of the time of filing.

The terms "axial" and "axially" refer to the axis of a gasket, pipe, or pipe joint (i.e., if the gasket, pipe or joint were a geometric cylinder, the axis of the cylinder) or a line parallel to it. For example, the "axial length" of an object associated with the gasket, pipe or joint is the distance occupied by that object along a line parallel to the axis of the pipe.

The terms "circumferential" and "circumferentially" refer to the circumference of a gasket, pipe, or pipe joint (i.e., if the gasket, pipe or joint were a geometric cylinder, the circumference of the cylinder) or an arc parallel to it. For example, a "circumferential width" of an object associated with the gasket, pipe, or pipe joint is the distance the object occupies along an arc of a circumference of said gasket, pipe, or pipe joint.

The terms "radial" and "radially" refer to the radius of a gasket, pipe, or pipe joint (i.e., if the gasket, pipe or joint were a geometric cylinder, a radius of the cylinder). For example, a "radial length" of an object associated with the gasket, pipe, or pipe joint is the distance the object occupies along a radial line of said gasket, pipe, or pipe joint. As another usage example, a "radial inner surface" of an object is a surface closer to the center of the cylinder, whereas a "radial outer surface" of the object is a surface farther from the center of the cylinder.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

B. Gasket Insert

Figure 6:
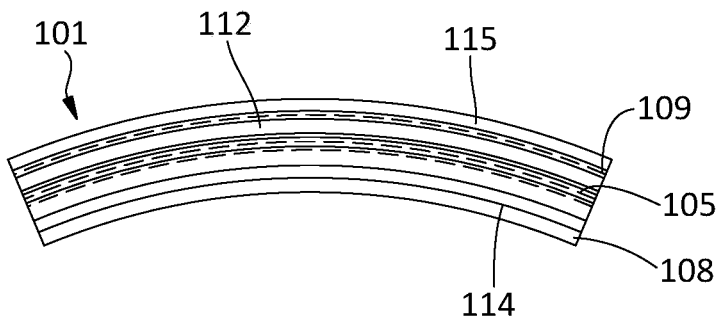
FIG. 6. A top view of an embodiment of the insert.
Figure 7:
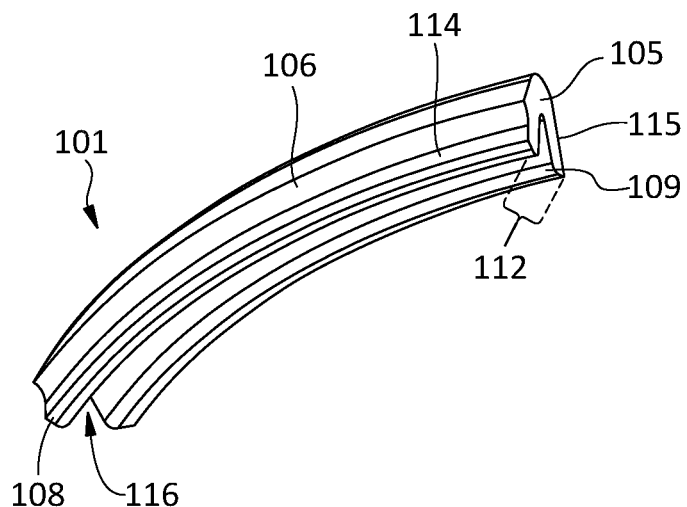
FIG. 7. A perspective view of the embodiment of the insert shown in FIG. 6.

A conductive insert 101 for a gasket 100 is described. Various embodiments of the insert 101 have the advantage of providing a strong electrical connection between a pipe spigot 118 and a socket 119, even under conditions of high deflection, when the electrical connection provided by conventional conductive gaskets might be reduced or broken. Various embodiments of the insert 101 have the advantage of high electrical conductivity and high resilience, preventing deformation of the conductive elements in the gasket that plague other conductive gaskets. An example of the insert 101 is shown in FIGS. 6 and 7.

A general embodiment of the insert 101 comprises a radial outer surface 111, defined in part by a groove 106, and a radial inner surface 110. The groove 106 may be specifically configured to accommodate a retainer bead 120 in a pipe joint 130, as explained further below. This embodiment of the insert 101 comprises a conductive body 105 roughly in the shape of a "U." Variations on the U-shape can include a more pointed "V" shape, less symmetrical shapes, etc. Using the jargon of typesetting, the U is formed by a first stem 108, a second stem 109, and an aperture 112 between the first and second stems 108, 109. The first stem 108 forms a majority of the groove's surface, and the second stem 109 forms a majority of the radial inner surface 110 of the insert 101. The aperture 112 of the U (or similar structure) contains a compressible resilient body 107. When the insert 101 is compressed such that the stems 108, 109 of the U are forced toward each other, the compressible resilient body 107 provides an outward counterforce. This may prevent permanent deformation of the conductive body 105, which may be made of a soft conductive metal that would otherwise permanently deform. A retainer body 104 is present along the radial outer surface 111 and adjoining the first stem 108. The retainer body 104 is configured to fit in the retainer seat 140 of a pipe joint 130. A bulb body 103 will generally be positioned on the insert 101 on the opposite side from the retainer body 104, and may be contiguous with the compressible resilient body 107.

Another general embodiment of the insert 101 comprises the U-shaped conductive body 105 having a first stem 108 with a first exterior surface 114, a second stem 109 with a second exterior surface 115, and a space 116 between the first stem 108 and second stem 109. A non-compressible body, which may take the form of the end of a gasket retainer 104, adjoins a portion of the second exterior surface 115. The compressible body 107 fills the space between the first stem 108 and the second stem 109, and with the first exterior surface 114 they at least partially define the radial inner surface 110 of the insert 101. The second exterior surface 115 and the non-compressible body 107 at least partially form the radial outer surface of the insert 111. The radial outer surface 111 comprises a groove 106, defined in major part by the second exterior surface 115. The groove 106 is positioned to accommodate the retainer bead 120 of a pipe joint 130, as in a conventional gasket.

The retainer body 104 and the groove 106 are positioned to accommodate and hold a retainer bead 120 of a pipe socket 122, analogous to similar structures in a conventional gasket. The groove 106 may be generally dimensioned to be about as wide as the retainer bead 120. However, the fit does not need to be perfect for a functional fit. The retainer body 104 may be dimensioned to fit in the retainer seat 140 of the joint 130; again, the fit does not need to be perfect for the retainer body 104 to function properly.

The inner and outer radial surfaces 110, 111 of the insert 101 refer to the surface that contacts the socket 119 (outer radial surface) and the surface that contacts the pipe spigot 118 (inner radial surface) when the insert 101 is part of a gasket 100 that is in place in a pipe joint 130. The conductive body 105 must form part of both radial surfaces to provide an electrical connection between them. Optionally, the non-compressible body may form part of the inner radial surface 110, the outer radial surface 111, or both. Alternatively, the insert 101 may be configured such that the non-compressible body does not form a part of either radial surface (e.g., if the non-compressible body is coated or jacketed).

Likewise, the compressible resilient body 107 may form a portion of the outer radial surface 111, a portion of the inner radial surface 110, or both. Alternatively, the insert 101 may be configured such that the compressible resilient body 107 does not form a part of either radial surface 110, 111 (e.g., if the compressible resilient body 107 is coated or jacketed). In some embodiments of the insert 101, the compressible resilient body 107 completely fills the aperture 112 of the U (the space between the stems 108, 109). Alternatively, gaps can be placed in the compressible resilient body 107, or the compressible resilient material can be interspersed with another material, so long as the body as a whole maintains its resilient properties.

The retainer 104 may have a hardness sufficient to prevent deformation and separation from the retainer seat when installed in a pipe joint 130. As the conductive bodies 105 will sometimes be composed of relatively soft conductive metal, in some embodiments of the insert 101 the conductive bodies 105 form no more than about half of the surface of the retainer 104. Further embodiments of the conductive body 105 may form less than half of the surface area of the retainer 104. In further embodiments of the insert 101, the conductive body 105 forms no more than 40, 30, 20, 10, or 5% of the surface area of the retainer 104. A specific embodiment of the insert 101 forms no significant portion of the surface of the retainer 104.

As explained above, in some embodiments of the insert 101 the conductive bodies 105 are generally U-shaped, with two stems 108, 109 and an aperture 112. In the illustrated embodiment of the insert 101 the aperture 112 faces the bulb 103 portion of the insert 101, such that it is contiguous with the bulb 103. The compressible resilient material in the aperture 112 may be the same material from which the bulb 103 is constructed, as the bulb 103 will typically also be made from a compressible and resilient material.

The conductive body 105 in the insert 101 functions to carry electrical current between the spigot 118 and the socket 119 when installed in a pipe joint 130 as part of the gasket 100. Some embodiments of the conductive body 105 comprise a conductive metal. The conductive metal will be selected on the basis of electric conductivity, hardness, ductility, and cost. Suitable conductive metals include copper, aluminum, beryllium, silver, and gold. Alloys and combinations of those metals, such as brass, can be used as well. In a preferred embodiment the conductive body 105 comprises copper. Further embodiments of the conductive body comprise 105 at least 70, 75, 80, 85, 90, 95, 96, 97, 98, and 99% copper. A more preferred embodiment of the conductive body 105 comprises 99.9% copper, such as C11000 electrolytic tough pitch (ETP) copper. Copper alloys are relatively inexpensive, highly conductive, and of relatively low toxicity for drinking water uses. An alternative embodiment of the conductor contains beryllium copper, which shows exceptional strength, durability, and electrical conductivity.

The conductive bodies 105 should have high electrical conductivity to assure sufficient current can pass between the spigot 118 and the socket 119 without excessive heat production. Some embodiments of the conductive body 105 have an electrical conductivity of at least 30 MS/m. Further embodiments of the conductive body 105 have an electrical conductivity of at least 40 MS/m. Still further embodiments of the conductive body 105 have an electrical conductivity of at least 50 MS/m. A specific embodiment of the conductive body 105 has an electrical conductivity of at least 60 MS/m. The conductivity of the conductive body 105 may be tailored to provide sufficient conductivity based on the conducting surface area between the insert 101 and the spigot 118 and the socket 119. In some cases, lower conductivity in the conductive body 105 may be acceptable if the conducting surface area is very high, or a low conducting surface area may be acceptable if the conductivity is extremely high.

The hardness of the conductive body 105 can be controlled to prevent it from cutting into the bulb portion 103 of the insert 101, which may be constructed from relatively soft elastomer. Some embodiments of the conductive body 105 are constructed of a material having a hardness that is sufficiently low to prevent the conductive body 105 from cutting into the bulb portion 103. In an exemplary embodiment, the conductive body 105 has a hardness of no more than about the hardness of copper. In further embodiments, the conductive bodies 105 have a hardness below about 120 Vickers Pyramid Number (HV). Some embodiments of the conductive body 105 have a hardness that does not exceed that of one or more of copper, aluminum, beryllium, silver, gold, and an alloy of two or more of the foregoing. Further embodiments of the conductive body 105 have a hardness that does not exceed that of 99.9% copper, such as C11000 ETP. A specific embodiment of the conductive body has a hardness of about that of 99.9% copper, such as C11000 ETP.

C. Gasket

A gasket 100 is described that includes the insert 101 as described above. The illustrated embodiments of the gasket 100 in FIGS. 1-5 are adapted for a pipe joint 130, although this is only one example of how the gasket 100 could be used. The gasket 100 has a gasket heel 102 and a bulb 103. The gasket heel 102 will generally be made of harder material than the bulb 103, the bulb 103 usually being made of a softer but resilient material.

The function of the bulb 103 is to provide the seal between two objects, and the heel 102 functions to hold the gasket 100 in place. The bulb 103 may be configured to provide a seal in various spaces, and the shape of the bulb 103 will vary accordingly. In the illustrated embodiment, the bulb 103 is an arc of a circle; being compressible, it will conform to the shape of the joint 130 when installed. Some embodiments of the sealing bulb 103 are constructed of an elastomeric material having a hardness of up to 65 Durometer Shore A. In a typical example, the sealing bulb 103 is constructed of an elastomeric material having a hardness of 50-65 Durometer Shore A.

The gasket heel 102 may comprise a groove 106 and a retainer 104. In the illustrated embodiment the retainer 104 and the groove 106 are adjacent on the radial outer surface 111 of the gasket 100. The retainer 104 functions to hold the gasket 100 in place, such as by extending into the retainer seat of a pipe socket 119. The groove 106 may also serve to hold the gasket 100 in place, such as by accommodating the retainer bead 120 of a pipe socket 119. The gasket heel 102 will generally have a higher hardness than the bulb 103. Some embodiments of the gasket heel 102 are constructed of a material having a hardness of at least 80 Durometer Shore A. In a typical example the gasket heel 102 is constructed of a material having a hardness of 80-85 Durometer Shore A. Hardness may be measured by any suitable method, preferably according to ASTM D2240-15e1 (2015). The gasket heel 102 may be made from any material suitable for operating conditions, such as having adequate corrosion resistance and creep resistance. Some embodiments of the gasket heel 102 are made from a polymeric material.

One or more inserts 101 are present in the gasket 100 to provide an electrically conductive connection between the inner and outer radial sides 110, 111. The conductivity of the gasket 100 as a whole might significantly differ from the conductivity of a single insert 101. In the example of ductile iron water pipes, the gasket 100 may conduct at least 600 A (5 min). The conductivity of the gasket 100 may be varied by varying the number of inserts 101, the conductivity of each insert 101, and the surface area of the inserts 101. The gasket 100 may comprise multiple inserts 101. Specific embodiments of the gasket 100 may comprise 1, 2, 3, 4, 5, 6, 7, 8, 9, 10, 11 or 12 inserts 101, at least any of the foregoing number of inserts 101, or at most any of the foregoing number of inserts 101. Specific embodiments of the gasket 100 comprise 2-3 inserts 101. In further embodiments of the gasket 100, each insert 101 can conduct at least 300 A (5 min). In a specific embodiment of the gasket 100, each insert 101 can conduct at least 600 A (5 min). Such embodiments have the advantage of providing adequate conductivity even if the pipe joint 130 deflects to break the connection with all of the other inserts 101, leaving only one insert 101 in contact with both components of the joint 130.

The circumferential width of the insert 101 can vary. Some embodiments of the insert 101 have a circumferential width sufficiently narrow to permit the gasket 100 to retain enough flexibility to be manually formed into a loop during installation of the gasket 100 in a socket 119 (see Anonymous U.S. Pipe: 24"-36" TYTON Gasket & TR FLEX Joint Installation, Jan. 31, 2018, available at https://www.youtube.com/watch?v=ZAYDq52LH20). Some embodiments of the insert 101 have a circumferential width large enough to conduct at least 300 A (5 min); further such embodiments of the insert 101 have a circumferential width large enough to conduct at least 600 A (5 min). Inserts 101 of certain circumferential widths can provide adequate contact areas using suitable conductive materials. Some exemplary embodiments of the insert 101 are about 2-4" in circumferential width. Further embodiments of the insert 101 are 2.4-3.6" in circumferential width. Still further embodiments of the insert 101 are 2.7-3.3" in circumferential width. A specific embodiment of the insert 101 is 3" in circumferential width. For example, in a 6" diameter gasket 100, some embodiments of the insert 101 extend over an arc of 30-60°. In further examples in a 6" diameter gasket 100, some embodiments of the insert 101 extend over an arc of 40-50°.

In a specific example in a 6" diameter gasket 100, some embodiments of the insert 101 extend over an arc of 46°. In a further specific example in a 6" diameter gasket 100, two or three inserts 101 are present (equally spaced) each extending over an arc of 46°. One such embodiment is shown in FIGS. 2-5, having two inserts 101 each of about 45° circumferential width.

Some embodiments of the gasket 100 comprise a slope 113 forming the radially inner surface 110 of the gasket. As shown in FIG. 1, a slope 113 may be present on the inner surface 110 of the gasket 100 tapering in an axial direction on the radially inner surface 110. Such a slope 113 may function to ease assembly without pushing the gasket 100 out of position; the ramp effect radially compresses the gasket 100 as the spigot 118 passes through the gasket 100.

Figure 8:
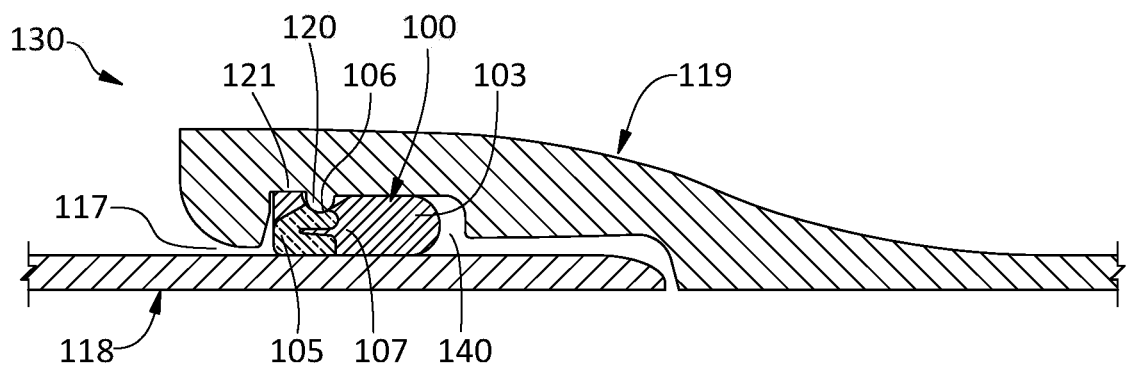
FIG. 8. An embodiment of a pipe joint containing the gasket shown in FIGS. 1-5.

FIG. 8. shows an embodiment of a pipe joint 130 in which an embodiment of the gasket 100 has been installed. The pipe joint 130 thus has an electrically conductive connection between the pipe spigot 118 and the socket 119. The gasket 100 is installed between the radially outer surface of the spigot 118 and the radially inner surface of the socket 119. As shown in the figure, the radially inner surface of the socket 119 end comprises a mouth 117 a retainer bead 120, and a retainer seat 140 between the mouth 117 and the retainer bead 120; the retainer on the gasket 100 is configured to fit within the retainer seat 140; and the groove 106 on the gasket 100 is configured to accommodate the retainer bead 120.

D. Exemplar Embodiments

In addition to anything described above or currently claimed, it is specifically contemplated that any of the following embodiments may be claimed.

Embodiment 1

An insert to provide conductivity to a gasket, the insert having a radial outer surface defined in part by a groove and a radial inner surface, and comprising:
a. a conductive body roughly in the shape of a U formed by a first stem, a second stem, and an aperture between the first and second stems, wherein the first stem forms a majority of the groove's surface, the second stem forms a majority of the radial inner surface;
b. a retainer body along the radial outer surface and adjoining the first stem; and
c. compressible resilient body in the aperture of the U.

Embodiment 2

An insert to provide conductivity across a gasket between a first pipe and a second pipe, the insert comprising:
a. a U-shaped conductive body having a first stem with a first exterior surface, a second stem with a second exterior surface, and a space between the first stem and second stem;
b. a non-compressible body adjoining a portion of the second exterior surface; and
c. a compressible body filling the space between the first stem and the second stem,
wherein the first exterior surface and the compressible body define at least partially radial inner surface of the insert, and the second exterior surface and the non-compressible body at least partially form a radial outer surface of the insert, and
further wherein the radial outer surface comprises a groove defined in major part by the second exterior surface.

Embodiment 3

Any one of the inserts above, wherein the retainer body and the groove are positioned to accommodate and hold a retainer bead of a pipe socket.

Embodiment 4

Any one of the inserts above, wherein the compressible resilient body forms a portion of the outer radial surface.

Embodiment 5

Any one of the inserts above, wherein the compressible resilient body forms a portion of the inner radial surface.

Embodiment 6

Any one of the inserts above, wherein the compressible resilient body forms a portion of the outer radial surface and forms a portion of the inner radial surface.

Embodiment 7

Any one of the inserts above, wherein the compressible resilient body completely fills the aperture of the U.

Embodiment 8

Any one of the inserts above, wherein the compressible body completely fills the space between the first stem and the second stem.

Embodiment 9

A gasket for providing an electrically conductive connection between two pipes, the gasket having an inner radial surface and an outer radial surface, and comprising:
a. a resilient sealing bulb;
b. a rigid gasket heel connected to the sealing bulb, the gasket heel comprising a groove on the outer radial surface and a retainer on the outer radial surface opposite the sealing bulb; and
c. any one of the inserts above.

Embodiment 10

A gasket for providing an electrically conductive connection between two pipes, the gasket having an inner radial surface and an outer radial surface, and comprising:
a. a resilient sealing bulb;
b. a rigid gasket heel connected to the sealing bulb, the gasket heel comprising a groove on the outer radial surface and a retainer on the outer radial surface opposite the sealing bulb; and
c. a plurality of conductive bodies, each forming a majority of the surface of the groove, and each forming a majority of the surface of the heel.

Embodiment 11

Any one of the inserts or gaskets above, wherein the conductive bodies form no more than a minority of the surface of the retainer.

Embodiment 12

Any one of the inserts or gaskets above, wherein the conductive bodies form no significant portion of the surface of the retainer.

Embodiment 13

Any one of the inserts or gaskets above, wherein the conductive bodies are generally U-shaped.

Embodiment 14

Any one of the inserts or gaskets above, wherein the conductive bodies are generally U-shaped, the U having a first stem, an aperture, and a second stem, and wherein the aperture faces the bulb portion.

Embodiment 15

Any one of the inserts or gaskets above, wherein the conductive bodies are generally U-shaped, the U having a first stem, an aperture, and a second stem, and wherein the aperture is filled with a resilient material.

Embodiment 16

Any one of the inserts or gaskets above, wherein each of said conductive bodies is constructed mostly of a conductive metal.

Embodiment 17

Any one of the inserts or gaskets above, wherein each of said conductive bodies comprises a conductive metal containing at least one of: copper, aluminum, beryllium, silver, gold, and brass.

Embodiment 18

Any one of the inserts or gaskets above, wherein each of said conductive bodies comprises copper.

Embodiment 19

Any one of the inserts or gaskets above, wherein each of said conductive bodies comprises 99.9% copper.

Embodiment 20

Any one of the inserts or gaskets above, wherein each of said conductive bodies comprises C11000 ETP copper.

Embodiment 21

Any one of the inserts or gaskets above, wherein each of said conductive bodies has an electrical conductivity of at least 30 MS/m.

Embodiment 22

Any one of the inserts or gaskets above, wherein each of said conductive bodies has an electrical conductivity of at least 40 MS/m.

Embodiment 23

Any one of the inserts or gaskets above, wherein each of said conductive bodies has an electrical conductivity of at least 50 MS/m.

Embodiment 24

Any one of the inserts or gaskets above 1, wherein each of said conductive bodies has an electrical conductivity of about 60 MS/m.

Embodiment 25

Any one of the inserts or gaskets above, wherein the conductive bodies have a hardness of no more than about the hardness of copper.

Embodiment 26

Any one of the inserts or gaskets above, wherein the conductive bodies have a hardness of no more than about the hardness of 99.9% copper.

Embodiment 27

Any one of the inserts or gaskets above, wherein the conductive bodies have a hardness of no more than about the hardness of C11000 ETP copper.

Embodiment 28

Any one of the inserts or gaskets above, wherein the conductive bodies have a hardness that is sufficiently low to prevent the conductive bodies from cutting into the bulb portion.

Embodiment 29

Any one of the inserts or gaskets above, wherein the conductive bodies have a hardness below about 120 Vickers Pyramid Number (HV).

Embodiment 30

Any one of the gaskets above, wherein said gasket conducts at least 600 A (5 min).

Embodiment 31

Any one of the gaskets above, wherein the sealing bulb is constructed of an elastomeric material having a hardness of about 50-65 Durometer Shore A.

Embodiment 32

Any one of the gaskets above, wherein the gasket heel is constructed of a polymeric material having a hardness of about 80-85 Durometer Shore A

Embodiment 33

Any one of the gaskets above, wherein the gasket heel's hardness exceeds the sealing bulb's hardness.

Embodiment 34

A conductive pipe joint, the joint comprising:
a. a first pipe having a socket end;
b. a second pipe have a spigot end; and
c. any one of the gaskets above between the outer surface of the spigot end and the inner surface of the socket end.

Embodiment 35

Any one of the pipe joints above, wherein: the inner surface of the socket end comprises a mouth, a retainer bead, and a retainer seat between the mouth and the retainer bead; the retainer on the gasket is configured to fit within the retainer seat; and the groove on the gasket is configured to accommodate the retainer bead.

E. Conclusion

The foregoing description and accompanying drawings illustrate and describe certain processes, machines, manufactures, and compositions of matter, some of which embody the invention(s). Such descriptions or illustrations are not intended to limit the scope of what can be claimed, and are provided as aids in understanding the claims, enabling the making and use of what is claimed, and teaching the best mode of use of the invention(s). If this description and accompanying drawings are interpreted to disclose only a certain embodiment or embodiments, it shall not be construed to limit what can be claimed to that embodiment or embodiments. Any examples or embodiments of the invention described herein are not intended to indicate that what is claimed must be coextensive with such examples or embodiments. Where it is stated that the invention(s) or embodiments thereof achieve one or more objectives, it is not intended to limit what can be claimed to versions capable of achieving all such objectives. Any statements in this description criticizing the prior art are not intended to limit what is claimed to exclude any aspects of the prior art.

Additionally, the disclosure shows and describes certain embodiments of the processes, machines, manufactures, compositions of matter, and other teachings disclosed, but it is to be understood that the teachings of the present disclosure are capable of use in various other combinations, modifications, and environments and is capable of changes or modifications within the scope of the teachings as expressed herein.

Any section headings herein are provided only for consistency with the suggestions of 37 C.F.R. § 1.77, or otherwise to provide organizational queues. These headings shall not limit or characterize the invention(s) set forth herein.

The following is claimed:

1. A gasket for providing an electrically conductive connection between two pipes, the gasket having an inner radial surface and an outer radial surface, and comprising:
    (a) a resilient sealing bulb;
    (b) a rigid gasket heel connected to the sealing bulb, the gasket heel comprising a groove on the outer radial surface and a retainer on the outer radial surface opposite the sealing bulb; and
    (c) a plurality of conductive bodies, each forming a majority of the surface of the groove.

2. The gasket of claim 1, comprising a slope on the radially inner surface of the gasket tapering in an axial direction, and wherein the conductive bodies each form a majority of the surface of the slope.

3. The gasket of claim 1, wherein the conductive bodies each form a majority of the surface of the heel.

4. The gasket of claim 1, wherein the conductive bodies form no more than a minority of the surface of the retainer.

5. The gasket of claim 1, wherein the conductive bodies form no significant portion of the surface of the retainer.

6. The gasket of claim 1, wherein the conductive bodies are generally U-shaped.

7. The gasket of claim 1, wherein the conductive bodies are generally U-shaped, the U having a first stem, an aperture, and a second stem, and wherein the aperture is filled with a resilient material.

8. The gasket of claim 1, wherein each of said conductive bodies is constructed mostly of a conductive metal.

9. The gasket of claim 1, wherein each of said conductive bodies comprises copper.

10. The gasket of claim 1, wherein each of said conductive bodies comprises 99.9% copper.

11. The gasket of claim 1, wherein each of said conductive bodies has an electrical conductivity of at least 30 MS/m.

12. The gasket of claim 1, wherein each of said conductive bodies has an electrical conductivity of about 60 MS/m.

13. The gasket of claim 1, wherein the conductive bodies have a hardness of no more than about the hardness of C11000 ETP copper.

14. The gasket of claim 1, wherein the conductive bodies have a hardness that is sufficiently low to prevent the conductive bodies from cutting into the bulb portion.

15. The gasket of claim 1, wherein the conductive bodies have a hardness below about 120 Vickers Pyramid Number (HV).

16. The gasket of claim 1, wherein said gasket conducts at least 600 A (5 min).

17. The gasket of claim 1, wherein the sealing bulb is constructed of an elastomeric material having a hardness of about 50-65 Durometer Shore A.

18. The gasket of claim 1, wherein the gasket heel is constructed of a polymeric material having a hardness of about 80-85 Durometer Shore A.

19. The gasket of claim 1, wherein the gasket heel's hardness exceeds the sealing bulb's hardness.

20. A conductive pipe joint, the joint comprising:
    (a) a first pipe having a socket end;
    (b) a second pipe have a spigot end; and
    (c) the gasket of claim 1 between the outer surface of the spigot end and the inner surface of the socket end.

21. An insert to provide conductivity across a gasket between a first pipe and a second pipe, the insert comprising:
    (a) a U-shaped conductive body having a first stem with a first exterior surface, a second stem with a second exterior surface, and a space between the first stem and second stem;
    (b) a non-compressible body adjoining a portion of the second exterior surface; and
    (c) a compressible body filling the space between the first stem and the second stem, wherein the first exterior surface and the compressible body define at least partially radial inner surface of the insert, and the second exterior surface and the non-compressible body at least partially form a radial outer surface of the insert, and further wherein the radial outer surface comprises a groove defined in major part by the second exterior surface.

22. An insert to provide conductivity to a gasket, the insert having a radial outer surface defined in part by a groove and a radial inner surface, and comprising:
   (a) a conductive body roughly in the shape of a U formed by a first stem, a second stem, and an aperture between the first and second stems, wherein the first stem forms a majority of the groove's surface, the second stem forms a majority of the radial inner surface;
   (b) a retainer body along the radial outer surface and adjoining the first stem; and
   (c) a compressible resilient body in the aperture of the U.

* * * * *